Figure 1:
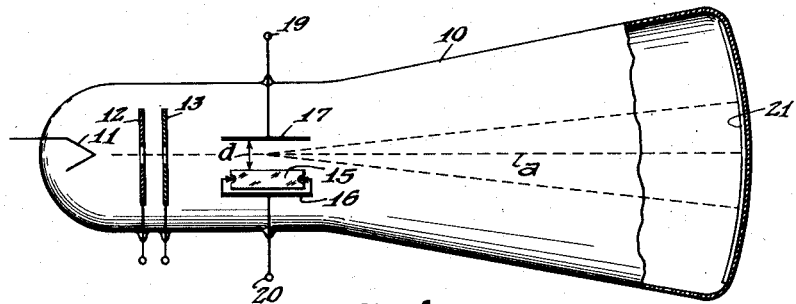

April 11, 1939.   H. E. HOLLMANN   2,154,127
ELECTROMECHANICAL OSCILLATING DEVICE
Filed June 9, 1937   3 Sheets-Sheet 1

INVENTOR.
Hans Erich Hollman
BY
ATTORNEY.

April 11, 1939.    H. E. HOLLMANN    2,154,127
ELECTROMECHANICAL OSCILLATING DEVICE
Filed June 9, 1937    3 Sheets-Sheet 3

INVENTOR.
Hans Erich Hollman
BY
ATTORNEY.

Patented Apr. 11, 1939

2,154,127

UNITED STATES PATENT OFFICE 2,154,127

ELECTROMECHANICAL OSCILLATING DEVICE

Hans Erich Hollmann, Berlin-Lichterfelde, Germany, assignor to Radio Patents Corporation, New York, N. Y., a corporation of New York Application June 9, 1937, Serial No. 147,323
In Germany July 7, 1936

13 Claims. (Cl. 250—158)

The present invention relates to electro-mechanical vibrating devices, more particularly to a composite cathode ray tube and electro-mechanical vibratory element such as a piezo-electric crystal or magneto-striction element adapted to translate the mechanical oscillations of the electro-mechanical vibrating element directly into deflections of an electron beam for visual indication and/or recording, or for varying the current collected by a target electrode impinged by the electron beam.

As is well known, electro-mechanical vibrating elements such as piezo-electric crystals or magneto-striction elements have numerous uses and applications in both the high frequency and low frequency arts as resonators with an exactly defined and invariant frequency and low damping coefficient or as a stabilizing means for maintaining constant the frequency of an oscillator or radio transmitter.

Due to the minute mechanical oscillations of the crystal oscillating either in a longitudinal or transverse direction it is not possible to observe the oscillations directly for the purpose of electric frequency measurements and it has been necessary for this reason to utilize the electrical effects produced by the oscillations. Dependent on the specific use and the energy available, various possibilities present themselves. A simple arrangement consists in observing the piezo-electric resonance potential produced by the crystal or to observe the high frequency current passing through the crystal which is at a maximum at resonance. While a separate measuring instrument is required for measuring the piezo-electric resonance potential exteriorly of the crystal, it is furthermore possible to obtain an indication by arranging the crystal in a gaseous atmosphere at low pressure, whereby the gas becomes ionized by the piezo-electric potentials and a glow discharge is produced at resonance. All these arrangements and methods, however, require comparatively large amounts of high or low frequency energy to cause the crystal to oscillate sufficiently so that a simple measuring instrument or indicating device can be used for the indication. This is especially the case when using a glow discharge in which case ignition potentials of more than 100 volts are required.

It is an object of the present invention to provide a piezo-electric crystal structurally combined with a cathode ray tube for recording and/or translating the oscillations of the crystal directly without any intermediate electrical means for producing an electric potential or current.

A more specific object is the provision of a composite cathode ray tube and piezo-electric crystal or similar mechanico-electrical vibrating element adapted for directly applying the piezo-electric potentials generated by the crystal to the electron beam of the tube to cause a deflection of the beam without requiring intermediary electrical circuits or amplifiers.

Another object is to provide a composite piezo-electric crystal or other mechanico-electrical vibrating device and an indicating or translating device characterized by a greatly increased sensitivity of response or accuracy of indication compared with arrangements known in the prior art.

Figure 2:
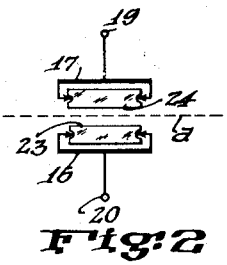
Figure 3:
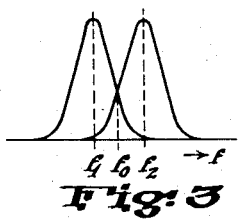
Figure 4:
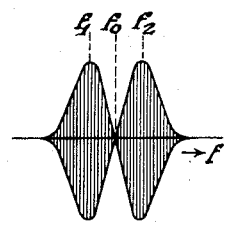
Figure 5:
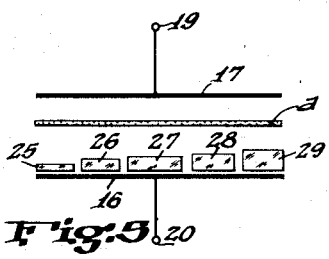
Figure 6:
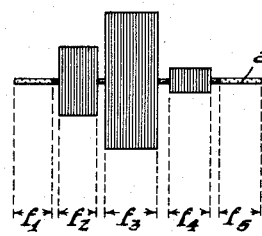
Figure 7:
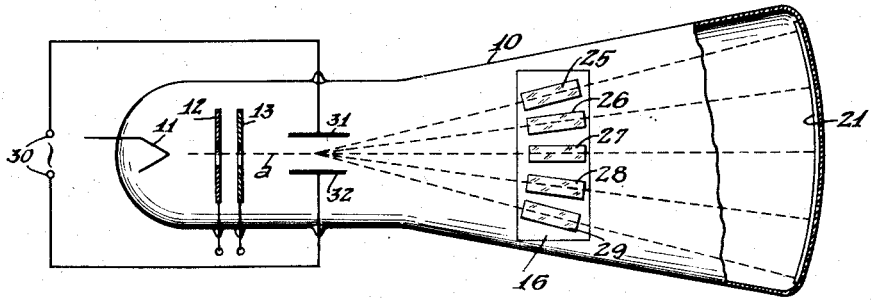
Figure 8:
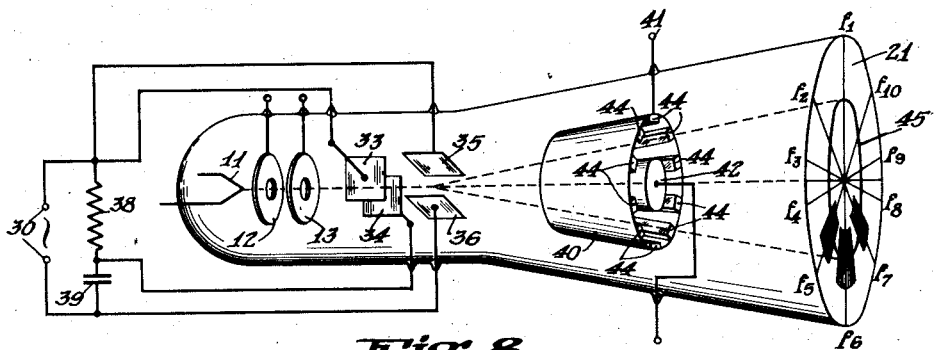
Figure 9:
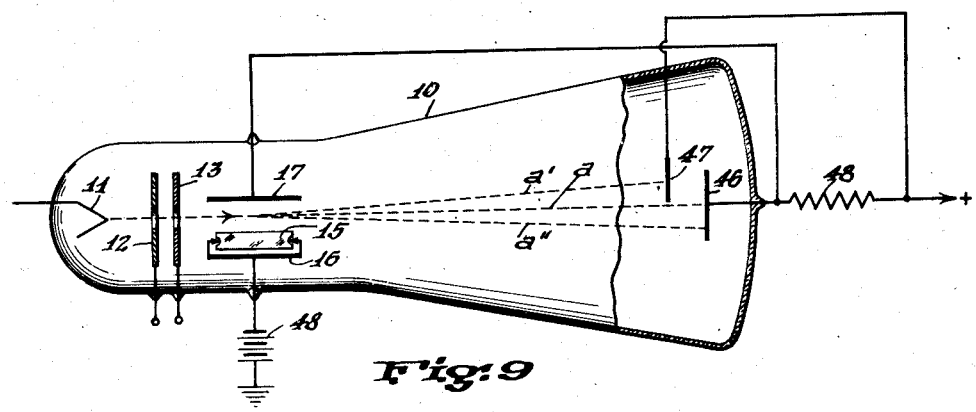
Figure 10:
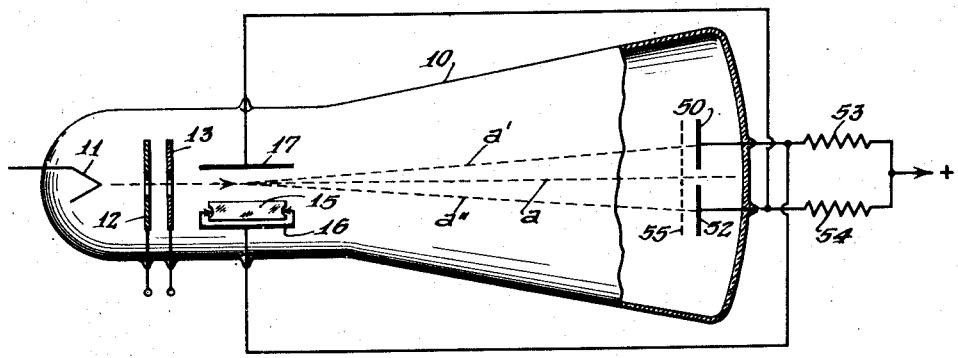

Further objects and features of the invention will become more apparent as the following detailed description proceeds taken with reference to the accompanying drawings forming part of this specification and wherein Figure 1 illustrates schematically a simple form of a composite piezo-electric crystal and cathode ray device constructed in accordance with the invention, Figure 2 illustrates a modified arrangement of piezo-electric crystals for use in a device according to Figure 1, Figures 3 and 4 represent resonance curves explanatory of the operation of an arrangement according to Figure 2, Figure 5 shows an arrangement comprising a plurality of piezo-crystals adapted to effect a direct indication of the frequency or wave length in a device of the type according to Figure 1, Figure 6 is a diagram explanatory of the function of an arrangement according to Figure 5, Figure 7 shows a modification for a direct reading frequency indicator comprising a multiplicity of piezo-electric crystals designed to have different natural frequencies, Figure 8 shows an alternative construction of a composite cathode ray device and frequency indicator utilizing a plurality of piezo-electric crystals, Figure 9 illustrates a cathode ray device and combined piezo-electric crystal adapted for producing an output current controlled by the oscillations of the crystal, Figure 10 is a modification of an arrangement of the type shown by Figure 9, Figures 11 to 15 illustrate improved arrangements of a piezo-electric crystal for use in cathode ray structures in accordance with the invention.

Similar reference characters identify similar parts throughout the different views of the drawings.

With the above mentioned objects in view, the present invention in one of its embodiments utilizes the geometric "leverage" afforded by an electron beam in a cathode ray tube acting as an inertialess lever and arranged to be deflected directly by the potentials generated by the piezo-electric effect. For this purpose, the electric field produced by the piezo-electric potentials between the surface of the crystal and an electrode spaced therefrom which latter serves simultaneously for applying the input potential exciting the crystal, is used as a deflecting field for the electron beam impinged upon a fluorescent screen or output target electrode in a cathode ray oscillograph of known construction. The minute deflections of the electron beam produced by the extremely weak piezo-electro deflecting field having a sufficient length are converted into considerable displacements of the luminous spot due to the pencil "leverage" or distance between the point of action or deflection and the fluorescent screen. In this manner it is possible to observe piezo-electric potentials as low as a few volts or to effect substantial variations of the beam current impinged upon a target.

Referring to Figure 1 of the drawings, numeral 10 represents a vessel including a cathode 11 which may be a thermionic cathode of either the direct or indirectly heated type and an arrangement such as an electro-static electron-optical system comprising a pair of annular acceleration electrodes 12 and 13 or the like to form what is known as an electron gun for producing a concentrated electron beam $a$ impinged upon the fluorescent screen 21 applied to the opposite wall of the tube or vessel 10. Any other known focussing arrangement such as an annular magnet coil serving as an electron collector or condenser device for producing a concentrated electron beam or pencil may be used for the purpose of this invention as will be understood. There is further shown a piezo-electric crystal which may consist of quartz, tourmaline or any other substance having piezo-electric characteristics mounted between a pair of electro-static deflecting plates 16 and 17 arranged at opposite sides of the electron beam. The plates 16 and 17 are connected to leads having outside terminals 19 and 20 for applying input potential variations to be compared or translated. In the example illustrated, the crystal 15 has its lower face arranged adjacent the lower deflecting plate 16 and has its upper face sufficiently spaced from the upper deflecting plate 17 by a distance $d$ to produce a piezo-electric deflecting field in the intervening space between the crystal and the plate 17 and to cause the fluorescent spot at the point of impingement of the electron beam to be deflected within a desired range on the fluorescent screen 21.

In order to obtain a low damping of the crystal oscillations, the crystal is preferably supported by a pair of knife edge elements as indicated schematically in the drawings. As described above, the potential whose frequency is to be compared or brought into accord with the natural frequency of the crystal is applied to the terminals 18 and 19 whereby a weak alternating field insufficient to effect an appreciable deflection of the electron beam is produced and the luminous spot upon the fluorescent screen remains unaffected or is spread or expanded only slightly. If, however, the frequency of the input or controlling potentials approaches the natural frequency of the crystal, the weak exciting potentials will be super-imposed upon the comparatively strong piezo-electric resonance potentials produced by the crystal. As a result, the deflecting field is increased considerably and a luminous line or streak will be produced upon the fluorescent screen 21 by the fluorescent spot moving back and forth in rapid succession. This line has a maximum length if the input potential is in resonance with the natural oscillating frequency of the crystal.

In practice, it was found that input or exciting potentials of a fraction of a volt suffice to enable a clear indication of the resonance condition. Since practically no load is imposed upon the crystal and since there are no reactions liable to cause a damping effect upon the crystal or to flatten its resonance characteristic, the resonance indication is extremely sharp and stable inasmuch as owing to the exceedingly small oscillatory energy there is practically no drift of frequency due to heating as is the case in systems known in the prior art.

When using the device in the vicinity of a powerful high frequency transmitter, it is possible under circumstances to dispense with the capacitative coupling of the crystal with the two deflecting plates (16 and 17), since the crystal itself may be sufficiently excited by the stray field of the transmitter or oscillator to vibrate sufficiently and produce an indication on the screen of the cathode ray tube. In this case, a tube of the type as shown in Figure 1 has only to be brought into the vicinity of a transmitter to adjust the transmitting frequency to correspond with the frequency of the crystal.

In order to effect a still sharper resonance indication than is possible by means of a single deflecting crystal, a pair of crystals in differential arrangement may be provided according to a further feature of the invention as shown in Figure 2. In the latter, there are shown two piezo-electric crystal elements 23 and 24 arranged at opposite sides of the electron beam $a$ to produce a piezo-electric deflecting field for the beam. The crystals are cut in such a manner that their natural frequencies deviate slightly but are sufficiently close so that the resonance curves overlap as shown in Figure 3. From the latter it is seen that a trough is produced in the resultant curve between the frequencies $f_1$ and $f_2$ corresponding to the natural frequencies of the crystals. This trough has an extremely sharp bottom (frequency $f_0$) provided that the resonance curves overlap within their steep descending and ascending branches, respectively, as shown in the drawings. Thus, if the frequency applied to terminals 19 and 20 corresponds to the frequency $f_0$ intermediate the crystal frequencies $f_1$ and $f_2$ one of the crystals will present a capacitative and the other crystal will present an inductive reactance. Therefore, the piezo-electric potentials are in exact phase opposition and compensate each other by reason of the fact that the deflecting fields due to the position of the crystals at opposite sides of the electron beam act in opposite directions. If both crystals have approximately equal damping coefficients, the electron beam in the case of an input or controlling frequency $f_0$ will remain in its zero or rest position in such a manner that with a variation of the impressed input frequency an indication is obtained as illustrated by the curve according to Figure 4 showing the displacement of the fluorescent spot as a function of the frequency applied. As is seen, the adjustment of the frequency $f_0$ is extremely critical by reason of the fact that it depends on the phase of the piezo-electric potentials rather than their amplitudes compared with arrangements of the type according to Figure 1.

The arrangement described above allows the determination or measurement of a single frequency equal to the natural frequency of the crystal. In order to enable a simultaneous operation with several frequencies, a number of piezo-electric deflecting systems each designed for a different frequency may be arranged, one behind the other in the direction of the electron beam. Aside from the fact that in an arrangement of this type the sensitivity of deflection for the successive deflecting system decreases due to the decreasing leverage of the electron beam, the closer the respective deflecting system is to the fluorescent screen, it is not possible with an arrangement constructed in this manner to ascertain which of the deflecting systems produces the deflection upon the fluorescent screen, i. e. which crystals are in resonance with the applied frequency. It is desirable, therefore, to provide a frequency scale upon the fluorescent screen having graduations corresponding to the frequencies of the several piezo-crystals. This can be accomplished by arranging the several crystals adjacent to each other as will be described in more detail hereafter. In an arrangement of the latter type either a separate electron beam may be provided for each crystal in the form of a multi-gun cathode ray device or a common flat electron beam may be used cooperating with all the crystals. Alternatively, a single beam may be provided and swept back and forth to scan the individual crystals in rapid succession.

There is shown in Figure 5 a simple arrangement of a multi-crystal indicating device constructed in accordance with the invention. The input or deflecting plates 16 and 17 are similar as shown in Figure 1. In place of a single crystal, a plurality of crystals 25, 26, 27, 28 and 29 in the example shown are provided mounted adjacent to each other and each having a different natural frequency increasing from the left to the right as indicated by the varying thickness in the drawings. As pointed out, a separate electron beam may be provided for each crystal by a multi-gun arrangement or a common beam having a flat linear cross-section as indicated at $a$ in Figure 5 may be provided for deflection by all of the separate crystal elements. A flat electron beam of this type may be produced in accordance with any one of the known methods, such as by means of a suitably shaped linear electron source and associated electron-optical concentrating arrangement comprising accelerating electrodes of a diaphragmatic construction having a narrow slit to define the cross-section of the beam. The portion of the electron beam opposite the crystal whose natural frequency is close to or coincides with the frequency of the input or deflecting potential applied to terminals 19 and 20 is subjected to the strongest oscillating field in such a manner that the corresponding zone of the linear image on the fluorescent screen is subjected to the greatest deflection.

The indicating pattern thus obtained on the fluorescent screen is shown in Figure 6. In the example illustrated, the measuring or controlling frequency lies between the frequencies $f_2$ and $f_3$ corresponding to the natural frequencies of the crystals 26 and 27 (Figure 5) and is somewhat closer to the frequency $f_3$ owing to the higher amplitude of the latter in the example illustrated. As is seen, the indication is similar to the known low frequency indicators using a plurality of mechanical vibrating reeds arranged side by side and each designed to have a different natural frequency of vibration.

As is understood, the accuracy of indication may be increased to have any desired value by using a corresponding number of crystal elements of sufficiently close frequency differentials.

Referring to Figure 7, there is shown an alternative arrangement of a multi-crystal frequency indicator according to the invention wherein an ordinary circular electron beam or pencil $a$ is used in place of a flat electron beam shown in Figure 5. The latter is swept back and forth (in the example shown in the plane of the drawings) by means of a pair of auxiliary deflecting plates 31 and 32 in such a manner that the piezo-electric potentials of the separate crystals 25 to 29 act successively upon the electron beam at such a rate however that the indication on the fluorescent screen appears to the human eye as a continuous image or pattern in a manner similar as shown in Figure 6. In order to accomplish this effect, a 60 cycle auxiliary deflecting potential supplied from a house lighting circuit and indicated at 30 may be used. In order to cause only one of the crystals to be scanned by the electron beam at a time, the crystals are preferably arranged in inclined positions as shown in the drawings. Aside from the substantial simplification of an arrangement by using a circular electron ray or pencil, the arrangement according to Figure 7 has the further advantage over the arrangement according to Figure 5 utilizing a flat electron beam that the frequency scale upon the fluorescent screen is expanded relative to the spacing of the crystals resulting in increased accuracy of indication and a possibility of increasing the number of the crystals in a given mounting space.

In Figure 5 the piezo-electric crystals have been shown to have an unequal spacing from the upper plate 17. In order to make the spacing even to obtain equal deflecting conditions for the separate crystals according to a further feature of the invention, the plate 16 serving as the mounting support for the crystals may be constructed of stepped shape, whereby the successive steps conform to the width of the crystals in such a manner that the upper surfaces of all the crystals are in a common plane to provide equal spacing from the upper or counter electrode 17. The crystal elements may be mounted upon the plate 16 in any suitable manner such as by means of knife edge supports similar as shown in the previous figures. The same applies to the arrangement according to Figure 7 wherein the upper electrode 17 (not shown) may have a flat shape and the lower electrode 16 may be constructed in stepped form to support the several crystal elements and to obtain equal spacing for all crystals from the upper electrode 17.

As is understood, the acceleration electrodes 12 and 13 constituting or forming part of the electro-static electron-optical lens system are biased by suitable positive potentials relative to the cathode, these and other known details, such as the mounting and supporting of several elements within the tube, obvious to those skilled in the art having been omitted to simplify the drawings and disclaimer.

The expansion of the frequency scale makes it necessary that the deflection by the auxiliary frequency have a definite value determined by the limits of the scale which must be maintained accurately. For this purpose, not only a predetermined auxiliary deflecting potential is required, but in addition a definite anode or acceleration potential in the beam generating system.

By an arrangement of the type shown in Figure 8, this requirement is substantially eliminated. In the latter, the frequency scale is of circular shape, whereby the deflections by the piezo-electric potentials occur in radial directions in the form of polar coordinates. The new form of the frequency scale is obtained by deflecting the electron pencil $a$ by means of a pair of alternating deflecting fields arranged at right angles and being dephased by 90 electrical degrees relative to each other. As is well known, two deflecting fields of this type result in a rotation of the electron beam, whereby the luminous spot on the fluorescent screen moves continuously along a circular trace. In the example illustrated, the deflecting fields are produced by two pairs of electro-static deflecting plates 33, 34 and 35, 36, respectively, arranged at right angles to each other. The plates 35, 36 are connected directly to a deflecting potential source 30 which may be a 60 cycle house lighting circuit, while the plates 33, 34 are connected across a resistance 38 forming a shunt across the source 30 in series with the condenser 39. In this manner a 90° phase shift is produced between the deflecting voltages applied to the plates 33, 34 and 35, 36, respectively, resulting in a rotary movement of the electron beam in the manner described.

The electron beam in an arrangement of this type describes a cone surface at the opposite sides of which are arranged a pair of concentric preferably conical electrodes 40 and 42 which correspond to the deflecting or input electrodes 16 and 17 according to the previous figures. The outer electrode 40 is connected to a terminal 41 and the inner electrode 42 is connected to terminal 43 which corresponds to terminals 19 and 20 of the previous illustrations. A number of piezo-electric crystals 44 in the example illustrated then are arranged circularly on the underside of the outer electrode 40 in such a manner that the electron beam normally rotates within the space between the inner electrode 42 and the crystals 44 thereby describing a circle 45 upon the fluorescent screen 21 under normal conditions and producing radial deflections superimposed thereon if the input or controlling frequency applied to terminals 41 and 43 approaches one or more of the natural frequencies of the crystals 44 in a manner substantially analagous to the function and operation of the arrangements described hereinbefore. It is seen that in a device of this type, the frequency scale upon the fluorescent screen is determined solely by the geometric projection of the electron beam upon the screen and that the size of the circle or the sensitivity of the auxiliary deflection or rotation at low frequency does not enter into or affect the accuracy of the frequency indication.

According to a further feature of the invention, the deflection of the electron beam may be utilized for varying the output current in a circuit connected to an output electrode or target impinged by the electron beam. In this embodiment of the invention, the tube may be used as an amplifier, modulator, oscillator, etc., as will appear in more detail hereafter. An embodiment of a deflector tube of this type is shown in Figure 9. The electron beam is deflected by the piezo-electric crystal 15 in a manner similar as described by the previous figures. However, instead of impinging the beam upon a fluorescent screen to produce a luminous indication or record, the beam is impinged upon a target or output electrode 46 so as to vary the beam current collected by this electrode as the beam is deflected in accordance with the piezo-electric potentials of the crystal. In the example illustrated, the electrode 46 is arranged symmetrically to the zero or normal position of the electron beam as shown and 46 is connected to an outside terminal and to a source of high potential in series with a load impedance 48 which may be an ohmic resistance, choke coil, tuned circuit or the like. In order to render the anode current in the output circuit including the impedance 48 dependent on the deflection of the electron beam impinged upon the electrode 46, an auxiliary anode or screen 47 directly connected to the high potential source is arranged in front of the anode 46 partly overlapping the latter. Thus, in the position $a'$ of the beam the entire beam current is impinged upon the electrode 47 and accordingly the anode current reduced to zero. In the position $a''$ of the electron beam, the entire beam current is collected by the anode 46 whereby the output current through the load impedance 48 is at a maximum. The potential produced across the anode side of the impedance 48 in the example shown is fed back upon the input plate 17 thereby in turn serving to excite the crystal 15. In this manner a regenerative excitation of the crystal is obtained in its natural oscillating frequency until the oscillations assume a stationary constant amplitude. By suitably shaping the electrode 47 it is possible to adjust the phase of the feedback potential in such a manner that the operation takes place either along the inductive or the capacitative branch of the resonance curve. A regenerative piezo-electric oscillator of this type is substantially free from any reaction upon the crystal, whereby the generator oscillates with a substantially constant phase and independently of exterior influences such as load variations or variations of other operating conditions. Instead of producing an anode current by directly collecting the electron beam current by a target electrode, a capacitative or inductive coupling of an output electrode with the electron beam may be used for the purpose of the invention.

Figure 10 shows a modified arrangement of a piezo-electric oscillator of the type according to the invention and differing from Figure 9 by the provision of a push-pull circuit. According to this embodiment, the electron beam is impinged upon a pair of similar target anodes 50 and 52 arranged symmetrically at opposite sides of the beam in such a manner that the beam current is collected in variable amounts by one or the other anode depending upon the deflection from its central or zero position. If the current collected by one of the electrodes increases, the current collected by the other electrode will decrease, while the sum of the currents remains substantially constant as in the case of similar push-pull systems known in the art. In order to prevent secondary electrons produced by the impact of the electron beam from effecting the focus or sharpness of the beam, a suppressor grid 55 of known construction is provided arranged in front of the anodes 50 and 52. The grid 55 is preferably negatively biased relative to the anodes 50 and 52 in any suitable manner, such as by the provision of a separate biasing potential source or by directly connecting the grid with the source of anode potential through a voltage drop resistance. In this manner, the grid serves as a suppressor by preventing secondary electrons from being emitted from the anode and affecting the focus and sharpness of the electron beam. In addition, by negatively biasing the grid 55, an accelerating electric field is produced in the space between the grid and the anodes resulting in increased sharpness and definition of the electron beam and in turn in a more accurate control of the current collected by the anodes as the beam is deflected laterally by the piezo-electric potentials.

The anodes 50 and 52 are connected to the high tension source in series with coupling impedances 53 and 54 on the one hand and to the input electrodes 16 and 17 in such a manner that the high frequency potential drops produced across the impedances 53 and 54 are fed back to the input circuit and the system maintained in a continuous oscillating condition.

As is understood, many variations may be made from the specific circuit arrangement shown such as by the use of an inductive or capacitative feedback in place of the direct feedback and other modifications obvious to those familiar with electron tube systems of this and similar character. A regenerative oscillator of the type described may be easily and effectively modulated in accordance with a low frequency or modulating potential which may be applied to any one of the known means for controlling the intensity of the electron beam, such as a suitably placed grid elecrode or to the negative concentration electrode usually surrounding the cathode.

In Figure 9 there is further shown a means such as a biasing battery 48' connected between the lower plate 16 and ground or other zero reference point of the system to counteract the anode potential impressed upon the plate 17 through the feedback connection and to bias the electron beam in the normal position to be impinged upon the electrode 46 as shown at $a''$. If the system is put in operation such as by exciting the crystal 15 by a suitable alternating potential applied to the plates 16 and 17 sustained oscillations will be maintained after the exciting potential has been removed. It is, however, also possible to start the tube by itself such as by closing the anode circuit similar as in the case of the known regenerative oscillators comprising an oscillatory circuit associated with an amplifying tube and including a back coupling arrangement for feeding back output energy upon the input circuit. In the present case, if the anode circuit is closed, the electron beam will be slightly deflected from its lower or normal position $a''$ due to the switching or transient impulse whereby a small portion of the beam current is impinged upon the electrode 47 resulting in a slight decrease of the output current through the load impedance 48 which in turn will cause a change of the potential at the anode 46. The latter is reflected upon the plate 17 thereby exciting the crystal 15. As a result, a piezo-electric potential is generated which in turn causes a greater deflection of the electron beam resulting in a further decrease of the output current through the load impedance 48 and a gradual building up of the oscillations until reaching a state of equilibrium and stable oscillating condition.

As is understood, a tube of the type shown in Figures 9 and 10 is not limited to the use as an oscillator but may be equally employed as a means for amplifying or selectively translating oscillatory energy which may be either modulated or unmodulated. Thus, if modulated carrier signal potentials having a frequency equal to the crystal frequency are impressed upon the plates 16 and 17 serving as input electrodes, amplified signal potentials may be derived from the impedance 48 which may be applied to a further amplifier of similar or different construction or used for operating a translating device.

In the arrangements described heretofore, it is necessary that the counter electrode 17 (Figure 1) or the distance between the crystals 23 and 24 (Figure 2) has a certain limit value (distance $d$), practically about 5 mm. to obtain a sufficient sweep of the fluorescent spot and prevent a cutting off of the electron beam in the extreme deflecting positions. This minimum distance or gap constitutes a disadvantage, especially when using very thin crystals, in which case the crystal is only loosely coupled with the input or control circuit supplying the exciting potential due to the comparatively low capacity of the gap required for producing the deflecting field. As a result, the crystal is only slightly excited and no appreciable indication or variation of an output current is obtained. The piezo-electric intensification by means of the crystal oscillations, therefore, decreases as the thickness of the crystal decreases; that is, as the frequency increases or as the wave length decreases. A theoretical analysis shows that the lower limiting wave length for which the piezo-electric amplification factor becomes unity in the case of a quartz crystal is about 600 meters and in the case of a tourmaline crystal about 25 meters. Below this wave length therefore arrangements of the type described above no longer produce an appreciable indication or variation of output current. The fact that the limit value for a tourmaline crystal is substantially lower than for a quartz crystal, is due to the substantially lower damping coefficient of the former.

The aforementioned defects are substantially overcome by the improved arrangements described in the following and shown in Figures 11 to 15 wherein the exciting and deflecting systems are substantially decoupled electrically and connected only by the electro-mechanical coupling afforded by the piezo-electric element. Thus, referring to Figure 11, there is shown a piezoelectric crystal 56 which preferably has an extended surface and is provided at one end with a pair of electrodes 57 and 58 arranged close to its opposite faces in the ordinary manner and serving for applying the input or control potential $e$. The deflecting field for the electron beam $a$ is produced at the opposite end of the crystal between one face thereof and an electrode 59 spaced from the crystal surface by a distance $d$ and preferably electrically connected to a counter electrode 60 arranged closely to the opposite face of the crystal as shown. In this manner the crystal is excited by the input potential $e$ and the oscillations transmitted purely mechanically to a deflecting field proper through which the electron beam *a* is passed, thereby substantially avoiding any electrical interaction between the exciting and deflecting systems. Since the electrodes 57 and 58 may be arranged close to the crystal surfaces, sufficient coupling is afforded at the highest frequencies due to the increased capacity while the electrode 59 may be sufficiently spaced from the crystal to enable a sweep of the electron beam over the entire surface of the fluorescent screen.

Figure 11:
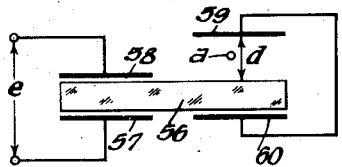
Figure 12:
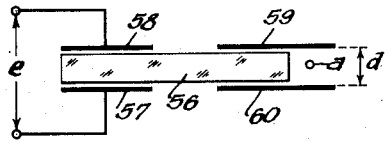

An alternative arrangement is shown in Figure 12 which differs from Figure 11 in that the electrodes 59 and 60 are arranged close to the crystal surface in a manner similar as the electrodes 57 and 58 but extend beyond the edges of the crystal thereby producing a deflecting field between the extending portions in a manner as is readily understood. Both arrangements are electrically equivalent with the only difference that the construction according to Figure 11 has the advantage of a decreased damping due to the increased spacing of at least one of the electrodes from the crystal surface.

Figure 13:
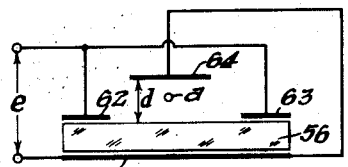

Referring to Figure 13 there is shown a symmetrical coupling arrangement of the type comprising a crystal 56 with one electrode 61 completely covering one surface thereof and a pair of counter electrodes 62 and 63 applied at the opposite ends of the other surface. The electrode 61 is connected to one pole of the input or control circuits and the electrodes 62 and 63 are connected to the other pole of the input circuit whereby the crystal is symmetrically excited by an input potential at its opposite ends. The deflecting field is produced by a further electrode 64 arranged symmetrically to the electrodes 62 and 63 and spaced from the crystal surface by the distance *d*. The electrode 64 is preferably electrically connected with the common outer electrode 61 as shown. By a symmetrical arrangement of this type a decrease of the oscillating amplitudes caused by the energy transmission at right angles to the direction of the oscillations is avoided or substantially minimized.

In arrangements of the afore-described character, the gap for the exciting system may be made as small as possible resulting in increased coupling and the possibility of indicating or translating currents of the highest practical frequencies while only the distance of the secondary plate to form the deflecting field is limited by the above value of 5 mm.

Figure 14:
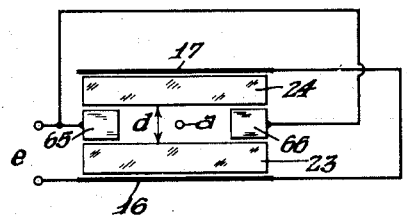
Figure 15:
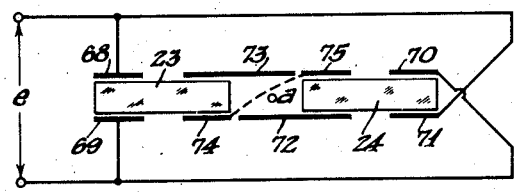

Referring to Figures 14 and 15, there are shown a pair of differentially arranged coupling systems of this character. In the arrangement according to Figure 14, the deflecting field is produced between a pair of crystals 23 and 24 of slightly differing natural frequencies such as described in connection with Figure 2. Both crystals are excited at their opposite ends by means of a pair of intermediate electrodes 65 and 66 connected to one pole of the controlling source whose other pole is connected to the electrodes 16 and 17 applied to the outer faces of the crystals. In this manner the distance *d* may have a desired value while the input electrodes may be arranged as close as possible to the crystal surface thereby eliminating the disadvantages and defects as pointed out above.

The arrangement according to Figure 15 differs from Figure 14 in that the crystals 23 and 24 are arranged side by side and have their outer ends excited in phase opposition by the input potential by means of electrodes 68, 69 and 70, 71, respectively, arranged closely adjacent to the crystal surfaces. The deflecting field is produced by a pair of electrodes 72 and 73 applied at the inner ends of the crystals and projecting beyond the edges of the crystals thereby providing a deflecting space for the electron beam *a*. The electrodes 72 and 73 are provided with counter electrodes 74 and 75 which are preferably connected in series as indicated.

It will be evident from the above that the invention is not limited to the specific arrangements of parts and circuits disclosed and methods described herein for illustration, but that the underlying novel concept and basic inventive idea are susceptible to numerous variations and modifications coming within the broad scope and spirit of the invention as defined in the appended claims.

The specification and drawings are accordingly to be regarded in an illustrative rather than in a limiting sense.

I claim:

1. The combination with a cathode ray device comprising means for producing a concentrated electron beam, of an electro-mechanical vibrating device arranged within said device to exercise directly a deflecting field upon said electron beam.

2. The combination with a cathode ray device comprising means for producing a concentrated electron beam, of a piezo-electric crystal element arranged within said device to exercise directly a piezo-electric deflecting field upon said electron beam.

3. The combination with a cathode ray device comprising means for producing a concentrated electron beam, of a pair of electrostatic deflecting plates arranged at opposite sides of said beam, and a piezo-electric crystal element having one surface arranged close to one of said plates and having its opposite surface spaced from the other plate to exercise directly a piezo-electric field upon the electron beam to deflect the beam in accordance with the oscillations of said crystal.

4. The combination with a cathode ray device comprising means for producing a concentrated electron beam and a pair of electrostatic deflecting plates arranged at opposite sides of said beams, of a piezo-electric crystal element arranged with one surface close to one of said plates and with its opposite surface spaced from the other plate to exercise a piezo-electric deflecting field upon said beam, and a pair of knife edge mountings supporting said crystal element at opposite ends thereof.

5. The combination with a cathode ray device comprising means for producing a concentrated electron beam, of a piezo-electric crystal element arranged within said device to exercise directly a piezo-electric deflecting field upon said beam if said crystal is excited to carry out electromechanical oscillations.

6. The combination with a piezo-electric crystal arranged in an evacuated space, of means for translating the oscillations of said crystal comprising means for producing a concentrated electron beam within said space adapted to be acted upon by the piezo-electric field generated by said crystal to cause a deflection of the beam in accordance with the crystal oscillations.

7. A device of the character described, comprising an evacuated vessel with means for producing a concentrated electron beam therein, a piezo-electric crystal element arranged within said device to exercise a piezo-electric field upon said electron beam to cause the deflection of said beam in accordance with the oscillations of said crystal, and a target within said vessel impinged by said electron beam.

8. A device of the character described, comprising an evacuated vessel, means for producing a concentrated electron beam therein, a piezo-electric crystal element having electrodes arranged at opposite sides thereof mounted within said vessel, one of said electrodes being close to the crystal surface and the other electrode being spaced from the crystal to provide a piezo-electric deflecting field for said electron beam, terminal leads from said electrodes to the outside of said vessel, and a fluorescent screen impinged by said electron beam.

9. In a device of the character described, an evacuated vessel with means for producing a concentrated electron beam therein having a substantially linear cross-section, a plurality of piezo-electric crystal elements each having a different natural frequency arranged to exercise piezo-electric deflecting fields upon different cross-sectional portions of said electron beam, and a fluorescent screen impinged by said electron beam.

10. A device of the character described, comprising an evacuated vessel with means for producing an electron beam therein, having a substantially linear cross-section, a pair of electrostatic deflecting plates disposed at opposite sides and parallel to said beam in its normal position, and a plurality of piezo-electric crystal elements arranged adjacent to each other between one of said plates and said electron beam, said crystal elements having successively increasing natural frequencies and adapted to exercise piezo-electric deflecting fields upon adjacent cross-sectional portions of said electron beam, and a fluorescent screen impinged by said beam.

11. A device of the character described, comprising an evacuated vessel with means for producing a concentrated electron beam therein, a fluorescent screen impinged by said beam, deflecting means for said beam for continuously moving the recording spot produced upon said screen along a predetermined line, and a plurality of piezo-electric crystal elements having successively increasing natural frequencies arranged to exercise piezo-electric deflecting fields to deflect said beam at a right angle to the line described by said first deflecting means.

12. A device of the character described comprising an evacuated vessel, means for producing a concentrated electron pencil therein, a luminescent screen impinged by said electron pencil, deflecting means for continuously moving the recording spot produced by said pencil upon said screen along a straight line, and a plurality of piezo-electric crystal elements having successively increasing natural frequencies and arranged side by side to exercise piezo-electric fields upon said pencil to further deflect said pencil in a direction substantially at right angles to said line.

13. A device of the character described comprising an evacuated vessel with means for producing a concentrated electron pencil therein, a luminescent screen impinged by said pencil, deflecting means for continuously rotating said pencil to describe a conical surface and to move the recording spot produced by said pencil upon said screen along a circular path, and a plurality of piezo-electric crystal elements having successively increasing natural frequencies and arranged in circular formation in spaced relation to said conical surface thereby to exercise piezo-electric fields upon said electron pencil to deflect said recording spot in a direction at right angles to its circular path.

HANS ERICH HOLLMANN.